(12) United States Patent
Ayazi et al.

(10) Patent No.: US 7,543,496 B2
(45) Date of Patent: Jun. 9, 2009

(54) CAPACITIVE BULK ACOUSTIC WAVE DISK GYROSCOPES

(75) Inventors: Farrokh Ayazi, Atlanta, GA (US); Houri Johari, St. Charles, MO (US)

(73) Assignee: Georgia Tech Research Corporation, Atlantic, GA (US)

( * ) Notice: Subject to any disclaimer, the term of this patent is extended or adjusted under 35 U.S.C. 154(b) by 211 days.

(21) Appl. No.: 11/601,956

(22) Filed: Nov. 20, 2006

(65) Prior Publication Data

US 2007/0220971 A1    Sep. 27, 2007

Related U.S. Application Data

(60) Provisional application No. 60/786,304, filed on Mar. 27, 2006.

(51) Int. Cl.
*G01P 9/04*    (2006.01)

(52) U.S. Cl. .................. 73/504.12; 73/504.01

(58) Field of Classification Search ............ 73/504.12, 73/504.13, 504.01, 504.02; 331/65
See application file for complete search history.

(56) References Cited

U.S. PATENT DOCUMENTS

| | | | |
|---|---|---|---|
| 3,719,074 | A | 3/1973 | Lynch |
| 4,793,195 | A | 12/1988 | Koning |
| 5,196,905 | A | 3/1993 | Hahn et al. |
| 5,226,321 | A | 7/1993 | Varnham et al. |
| 5,450,751 | A | 9/1995 | Putty et al. |
| 5,783,749 | A | 7/1998 | Lee et al. |
| 6,128,954 | A | 10/2000 | Jiang |
| 6,539,801 | B1 | 4/2003 | Gutierrez et al. |
| 6,837,107 | B2 | 1/2005 | Geen |
| 6,848,304 | B2 | 2/2005 | Geen |
| 6,909,221 | B2 | 6/2005 | Ayazi et al. |
| 6,985,051 | B2 * | 1/2006 | Nguyen et al. ............ 333/186 |
| 7,360,423 | B2 * | 4/2008 | Ayazi et al. ............ 73/504.12 |
| 2001/0039834 | A1 | 11/2001 | Hsu |
| 2003/0000306 | A1 | 1/2003 | Fell |
| 2003/0127944 | A1 | 7/2003 | Clark et al. |
| 2003/0196490 | A1 | 10/2003 | Cardarelli |
| 2004/0055380 | A1 | 3/2004 | Shcheglov et al. |
| 2004/0060898 | A1 | 4/2004 | Tsai |

(Continued)

OTHER PUBLICATIONS

T. Fujita et al., "Disk-Shaped Bulk Micromachined Gyroscope With Vacuum Sealing", Sensors and Actuators, vol. 82, May 2000, pp. 198-204.*

(Continued)

*Primary Examiner*—John E Chapman
(74) *Attorney, Agent, or Firm*—Wolf, Greenfield & Sacks, P.C.

(57) ABSTRACT

Capacitive bulk acoustic wave x, y and z-axes gyroscopes implemented on (100) and (111) silicon substrates are disclosed. Exemplary gyroscopes comprise a handle substrate, a bulk acoustic wave resonator element supported by the handle substrate, and a plurality of electrodes surrounding and separated from the resonator element by very small capacitive gaps. The electrodes can excite and detect at least two degenerate bulk acoustic wave resonant modes in the resonator. Advantages include reduced size; higher Q, which improves noise and bias stability; larger bandwidth, and improved shock resistance. In addition, the high Q is maintained in atmospheric or near-atmospheric pressure which reduces the cost and complexity of the wafer-scale packaging of the gyroscope.

17 Claims, 8 Drawing Sheets

U.S. PATENT DOCUMENTS

| | | |
|---|---|---|
| 2005/0028591 A1 | 2/2005 | Lonsdale et al. |
| 2005/0150296 A1 | 7/2005 | Painter et al. |
| 2005/0172714 A1 | 8/2005 | Challoner et al. |
| 2006/0037417 A1 | 2/2006 | Shcheglov et al. |
| 2007/0017287 A1 | 1/2007 | Kubena et al. |
| 2007/0034005 A1 | 2/2007 | Acar et al. |
| 2007/0119258 A1 | 5/2007 | Yee |
| 2007/0240508 A1 | 10/2007 | Watson |
| 2008/0148846 A1 | 6/2008 | Whelan et al. |

OTHER PUBLICATIONS

M. W. Judy, "Evolution of Integrated Inertial MEMS Technology," Solid-State Sensors, Actuators and Microsystems Workshop, Hilton Head Island, South Carolina, Jun. 2004, pp. 27-32.

M. F. Zaman, et. al., "The Resonating Star Gyroscope," Proceedings IEEE Conference on MEMS, Jan. 2005, pp. 355-358.

International Search Report and Written Opinion for International application No. PCT/US06/45931 mailed Feb. 11, 2008.

* cited by examiner

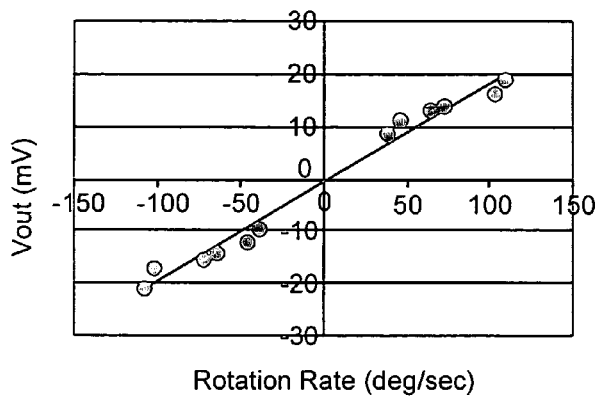
Fig. 7
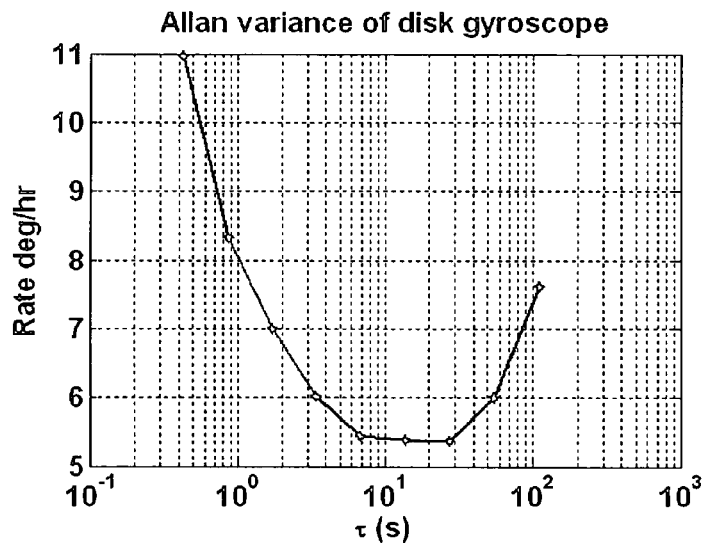
Fig. 8
Fig. 9a
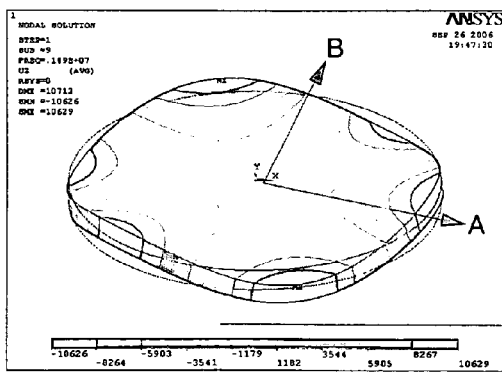
Fig. 9b
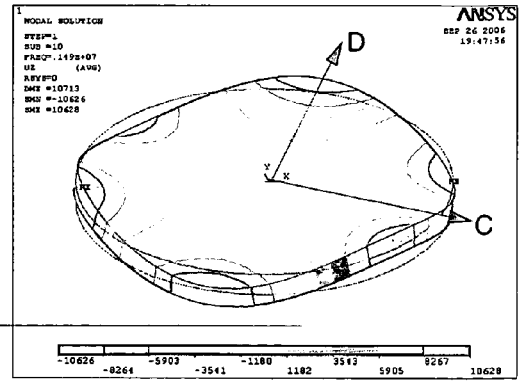

CAPACITIVE BULK ACOUSTIC WAVE DISK GYROSCOPES

This application claims the benefit of U.S. Provisional Application No. 60/786,304, filed Mar. 27, 2006.

FEDERALLY SPONSORED RESEARCH

This invention was made with Government support under Agreement No. ECS-0301900 awarded by the National Science Foundation of the United States. The Government has certain rights in this invention.

BACKGROUND

A gyroscope is a sensor that measures rate or angle of rotation. Micromachined gyroscopes constitute one of the fastest growing segments of the microsensor market. The application domain of these devices is quickly expanding from automotive to aerospace, consumer applications, and personal navigation systems. A multitude of applications exist in the automotive sector including short-range navigation, anti-skid and safety systems, roll-over detection, next generation airbag and anti-lock brake systems. Consumer electronics applications include image stabilization in digital cameras, smart user interfaces in handhelds, gaming, and inertial pointing devices. Some applications require single-axis gyroscope (Z-axis) and some require multiple axis rotation sensing (about X and Y and/or Z axes).

Miniature gyroscopes can be used for navigation. Inertial navigation is the process of determining the position of a body in space by using the measurements provided by accelerometers and gyroscopes installed on the body. Inertial Measurement Units (IMU) for short-range navigation are vital components in aircraft, unmanned aerial vehicles, GPS augmented navigation and personal heading references. An IMU typically uses three accelerometers and three gyroscopes placed along their respective orthogonal sensitive axes to gather information about an object's direction and heading. The components of acceleration and rotation rate can consequently be interpreted to yield the object's accurate position in space. An IMU is self-contained and can perform accurate short-term navigation of a craft/object in the absence of global positioning system (GPS) assisted inertial navigation.

Current state-of-the-art micromachined vibrating gyroscopes operate at low frequencies ($\omega_0$=3-30 kHz) and rely on increased mass (M) and excitation amplitude ($q_{drive}$) to reduce the noise floor and improve bias stability. If operated in 1-10 mTorr vacuum, such devices can achieve quality factors (Q) values on the order of 50,000 mainly limited by thermoelastic damping in their flexures. It is known that the fundamental mechanical Brownian noise of a vibratory gyro is given by:

$$\Omega_{z(Brownian)} \propto \frac{1}{q_{drive}} \sqrt{\frac{4k_B T}{\omega_0 M Q_{Effect-Sense}}}$$

where $q_{drive}$ is the drive amplitude; $\omega_0$, M, and $Q_{effect-sense}$ are the natural frequency, mass and effective quality factor at the sense mode, respectively; $k_B$ is the Boltzmann constant and T is the absolute temperature.

Current state of the art micro-machined gyroscopes operate at a relatively low frequency (5-30 kHz) in their flexural modes and have a Q of less than 50,000 in high vacuum which results in a high noise floor with limited mass. It would be desirable to reduce the noise floor of vibrating gyros without having to increase the mass and drive amplitude, which is difficult to achieve in low power and small size. As will be disclosed herein, a capacitive bulk acoustic wave gyroscope can accomplish this task by (1) increasing the resonant frequency by 2 to 3 orders of magnitude (to 2-8 MHz), and (2) increasing Q significantly by utilizing bulk acoustic modes that experience significantly less thermoelastic damping compared to flexural modes. The very high Q of the bulk acoustic modes will translate into superior bias stability in these gyros. Operation at high frequencies can increase the frequency bandwidth of the gyroscope by orders of magnitude, which decreases the response time of the sensors and relaxes the mode-matching requirements. Another benefit of increasing the resonant frequency of the gyro is in increasing the stiffness of the device by orders of magnitude, which translates into much higher shock resistance for the device (100 kG tolerance). In addition, the large stiffness of the device makes it less susceptible to air damping, which simplifies the packaging and reduces manufacturing cost by eliminating the need for high vacuum encapsulation.

U.S. patents relating to gyroscopes include: U.S. Pat. No. 5,450,751 issued to Putty, et al. entitled "Microstructure for vibratory gyroscope;" U.S. Pat. No. 6,128,954 issued to Jiang entitled "Spring for a resonance ring of an angular rate sensor;" U.S. Pat. No. 3,719,074 issued to Lynch entitled "Hemispherical Resonator Gyroscope;" U.S. Pat. No. 4,793,195 issued to Koning entitled "Vibrating cylinder gyroscope and method;" U.S. Pat. No. 6,848,304 issued to Geen entitled Six degree of freedom micromachined microsensors;" and U.S. Pat. No. 6,837,108 issued to Geen entitled "Micro-machined multi sensor providing 1-axis of acceleration sensing and 2-axes of angular rate sensing."

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 is a graph that shows measured sensitivity results of an exemplary reduced to practice 1200 µm diameter bulk acoustic wave gyroscope in (111) silicon substrate;

FIG. 8 is a graph that shows a root Allan variance plot of primary elliptical modes for an exemplary reduced to practice 1200 µm diameter bulk acoustic wave disk gyroscope in (111) silicon substrate;

FIGS. 9a and 9b show ANSYS simulation results for out of plane degenerative modes of an exemplary 800 μm diameter single crystal silicon disk gyroscope.

DETAILED DESCRIPTION

Figure 1:
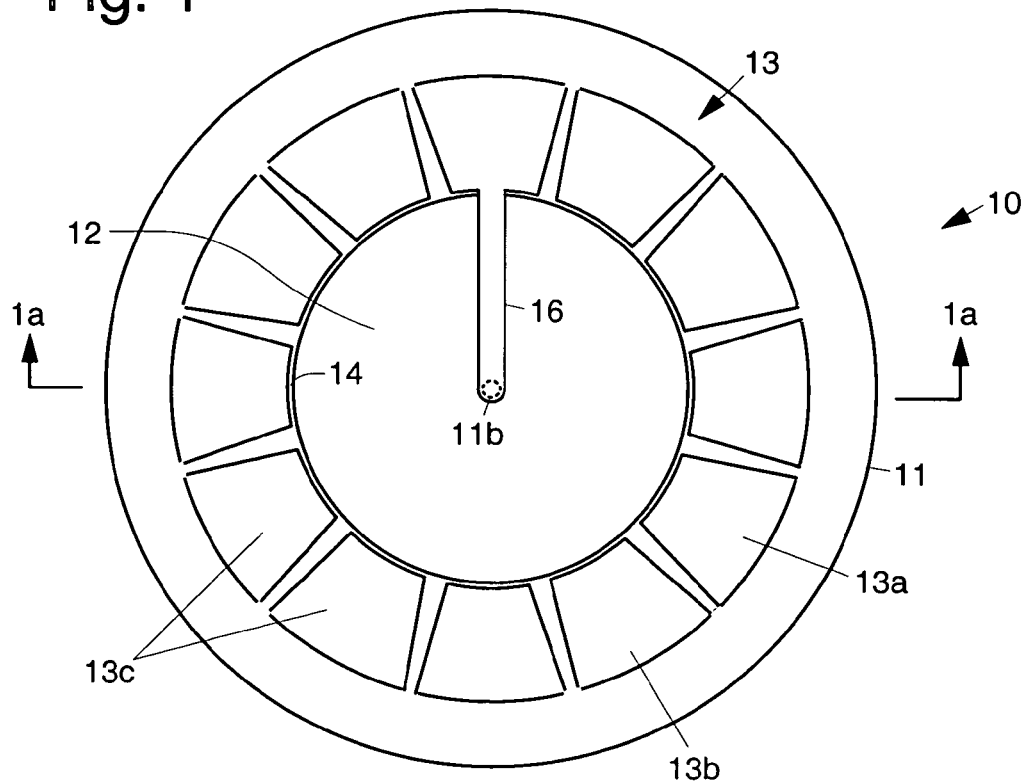
FIG. 1 illustrates an exemplary bulk acoustic wave gyroscope.
Figure 1A:
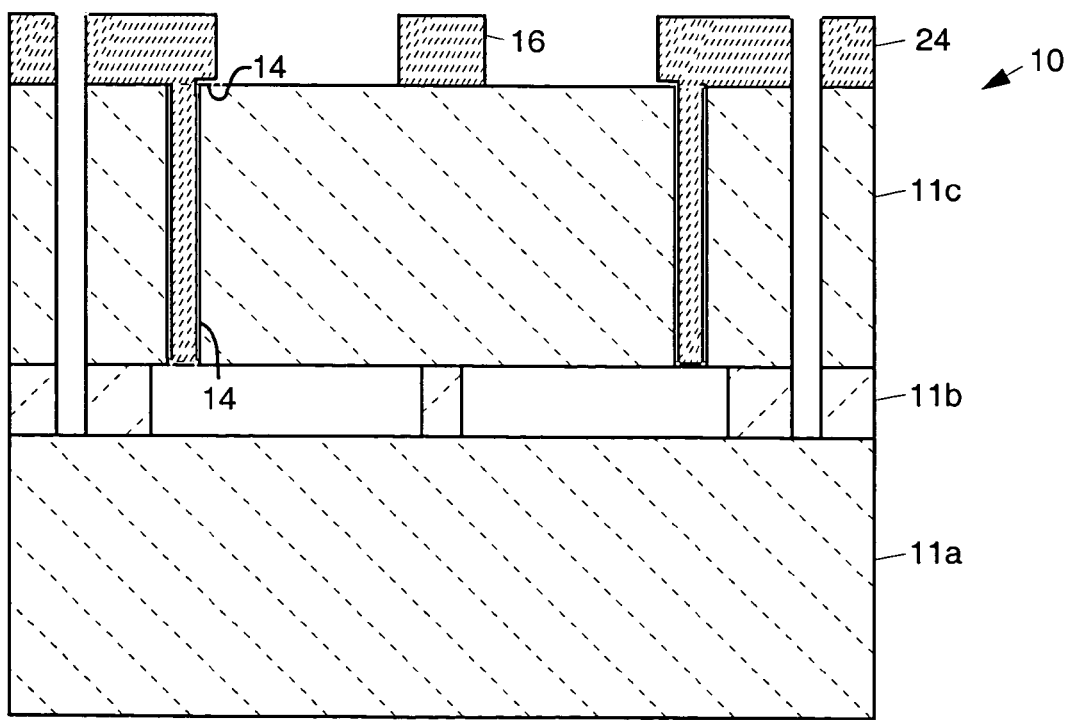
Figure 3:
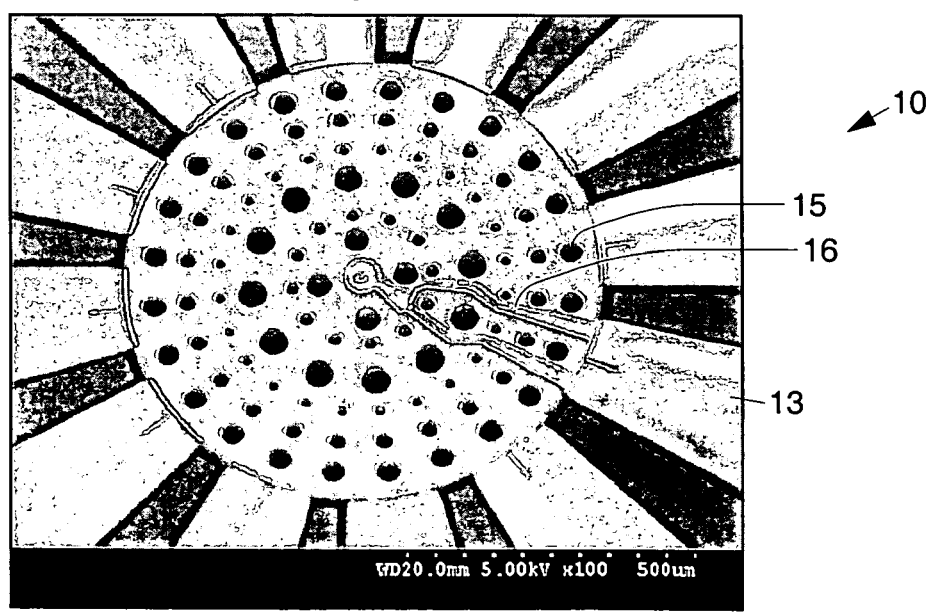
FIG. 3 is a scanning electron microscope (SEM) view of a portion of an exemplary 800 µm diameter bulk acoustic wave gyroscope.

Referring to the drawing figures, disclosed herein are high frequency (MHz range) Z-axis and XY-axis Coriolis-based, capacitive bulk acoustic wave gyroscope apparatus 10 or gyroscopes 10. As is illustrated in FIG. 1, the gyroscopes 10 comprise a handle substrate 11, which may be a silicon-on-insulator (SOI) substrate 11. A resonator element 12 (resonating disk 12 or resonating disk structure 12) is supported by an insulating (buried oxide) layer 11b of the handle substrate 11. A plurality of electrodes 13 surround and are separated from the resonator element 12 by very small capacitive gaps 14. The electrodes 13 can excite and detect at least two degenerate bulk acoustic wave resonant modes in the resonator element 12. The resonator element 12 is generally a disk-like resonator element 12, which may be circular or polygonal. The resonator element 12 may be solid or perforated. The resonator element 12 does not have to be made out of a piezoelectric material. In fact, the preferred choice is a non-piezoelectric material, such as single-crystalline or polycrystalline silicon. Other semiconducting, piezoelectric or metallic material such as silicon carbide, diamond, nanocrystalline diamond, gallium nitride, aluminum nitride, or quartz can be used to make the resonator element. FIG. 3 is a scanning electron microscope (SEM) view of a portion of an exemplary 800 μm diameter capacitive bulk acoustic wave gyroscope 10 having a perforated resonator element 12. The plurality of electrodes 13 generally includes drive electrodes 13a, sense electrodes 13b and electrostatic tuning electrodes 13c. The rest of electrodes 13 can be utilized to align the degenerative bulk acoustic modes with the center of electrodes (i.e. to cancel the quadrature errors).

More particularly, exemplary 800 μm and 1200 μm diameter center-supported single crystal silicon (SCS) perforated disk gyroscopes 10 are disclosed. An exemplary 800 μm diameter disk gyroscope 10 was implemented on a 50 μm thick (100) single crystal silicon (SCS) substrate and was configured to be operated in high order elliptic modes. The 1200 μm diameter disk gyroscope 10 was fabricated on a 35 μm thick (111) SCS substrate and was configured to be operated in primarily elliptic modes. In both cases, (100) SCS and (111) SCS substrates are the top layer (device layer) of SOI substrate 11. High aspect ratio trenches 14 comprising the capacitive gaps 14 were realized using a combined polysilicon and single crystal-silicon micro-machining process known in the art as HARPSS, implementing the capacitive disk gyroscopes 10 on thick SOI substrates 11 (30-50 μm) with very small capacitive gaps 14 (180-250 nm). Prototype bulk acoustic wave gyroscopes 10 show ultra high quality factor in excess of 100,000.

Exemplary bulk acoustic wave gyroscopes 10 may be implemented on a single crystal silicon disk structure. The disk structure may have a solid or perforated configuration (FIG. 3). If a perforated disk 12 is used, symmetrical release holes 15 (shown in FIG. 3) are repeated every 30° in (100) SCS substrate and every 45° in (111) SCS substrate to minimize the resonance frequency separation between the two degenerative modes. The solid bulk acoustic wave disk gyroscope 10 is supported at its center with one or more suspended polysilicon traces 16 from the top. The perforated bulk acoustic wave disk gyroscope can be supported with buried oxide 11b of the SOI substrate 11 at the bottom. Also, the suspended polysilicon trace 16 on the disk surface provides the DC bias to the disk 12. In order to capacitively excite and balance the high order out-of-plane elliptical modes, twelve polysilicon electrodes 13, for example, extend over the top of the disk 12 at 30° intervals. The size of the capacitive gaps 14 between the extended polysilicon electrodes 13 and the resonating disk 12 is the same as the vertical capacitive gaps (typically 200 nm).

Two out-of-plane degenerative modes are available in SCS disk structures at an identical resonance frequency. These two out-of-plane degenerative modes are symmetric about the center of the disk 12 but 30° off circumferentially in-plane. The top electrodes 13 are placed every 30° in-plane to detect and sense out-of-plane degenerative modes. When one of the out-of-plane degenerative modes in FIG. 9a is driven such that its anti-node is aligned to the roll-axis (X-axis), upon application of a roll rotation (rotation about X-axis) the energy will transfer from this first out-of-plane degenerative mode (FIG. 9a) to the second out-of-plane degenerative mode (FIG. 9b). Consequently, the output signal due to the roll rotation can be measured at the electrodes 13 that are located at the anti-nodes of the second degenerative mode (for example, FIG. 9b, D line). Since the first degenerative mode (FIG. 9a, B-line) is at its zero displacement (node point) along the pitch rotation axis, there will be no transfer of energy from the first out-of-plane degenerative mode (FIG. 9a) to the second out-of-plane degenerative modes (FIG. 9b) due to the pitch rotation (rotation about Y-axis). As a result, if both pitch and roll rotations are applied simultaneously, the prototype technique can offer the solution to separate the roll from pitch rotation. This procedure can be used to measure pitch rotation when the one of the out-of-plane degenerative mode (FIG. 9b) is driven such that its anti-node is aligned to the pitch-axis (y-axis),and the other out-of-plane degenerative mode FIG. 9a is used to measure the output signal.

A version of the HARPSS process may be used to fabricate the center-supported SCS disk gyroscope 10 on 30 to 50 μm thick SOI wafers 11. For gyroscopes 10 using bulk acoustic wave modes, the minimum detectable rotation rate, which is normally limited by the electrical noise, can be improved by orders of magnitudes over currently-available vibratory microgyroscopes.

An advantage of the high frequency bulk acoustic wave gyroscope 10 is in reduction of the mechanical (Brownian) noise floor (3 to 4 orders of magnitude) due to an increase in the resonant frequency by 2 to 3 orders of magnitude (to 2-10 MHz), and a significant increase in Q by utilizing bulk acoustic modes that experience less thermoelastic damping compared to flexural modes. Further advantages of the high frequency bulk acoustic wave gyroscopes 10 are that they have: reduced size; higher Q, which improves noise performance and bias stability; larger bandwidth (BW=f/Q>25 Hz), and improved shock resistance. In addition, the high Q is maintained under atmospheric or near atmospheric pressure, which simplifies packaging of the gyroscopes 10 and reduces manufacturing costs. The gyroscopes 10 can be operated at in-plane high order degenerative resonance modes which are different at the resonance frequency from the out-of-plane degenerative modes. As a result, the gyroscopes 10 can be used to measure the yaw rotation as well as roll and pitch rotation at the different operating resonance frequencies. Finally, the design is not sensitive to variation in thickness of the bulk acoustic wave disk gyroscope 10 which in turn has advantages in term of manufacturability. A very unique feature in capacitive bulk acoustic wave disk gyroscopes 12 is that they are stationary devices compared to conventional vibratory gyroscopes since the vibration amplitudes is less than 20 nm due to their very small capacitive gaps (~200 nm).

The capacitive bulk acoustic wave disk gyroscopes 10 operate in the MHz frequency range, and are stationary devices with vibration amplitudes less than 20 nm, and achieve very high quality factors (Q) in moderate vacuum (and even atmospheric pressure), which substantially simplifies their wafer-level packaging. In addition, their much lower operating DC voltages (Vp<5 V) and AC actuation voltages (160 mV) simplify the interface circuit design and implementation using standard CMOS processing. Also, operating vibratory gyroscopes 10 at high frequencies increases the frequency bandwidth by orders of magnitudes compared to low frequency mode-matched devices, which decreases the response time of the sensors and relaxes the mode-matching requirements.

As schematically shown in FIG. 1, the exemplary Coriolis-based bulk acoustic wave gyroscope 10 includes a center-supported disk structure 12 (resonating element 12) with capacitively-coupled drive 13a, sense 13b and control electrodes 13c. The capacitive SCS bulk acoustic wave disk gyroscope 10 is designed to operate in either primary or secondary degenerative elliptic modes.

Figure 2A:
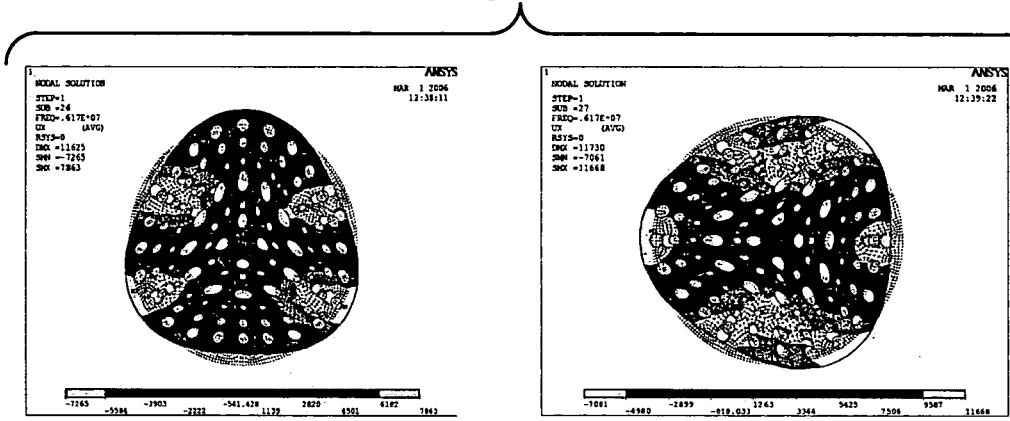
FIGS. 2a and 2b show ANSYS simulation data illustrating secondary and primary elliptical modes of an exemplary bulk acoustic wave gyroscope.
Figure 2B:
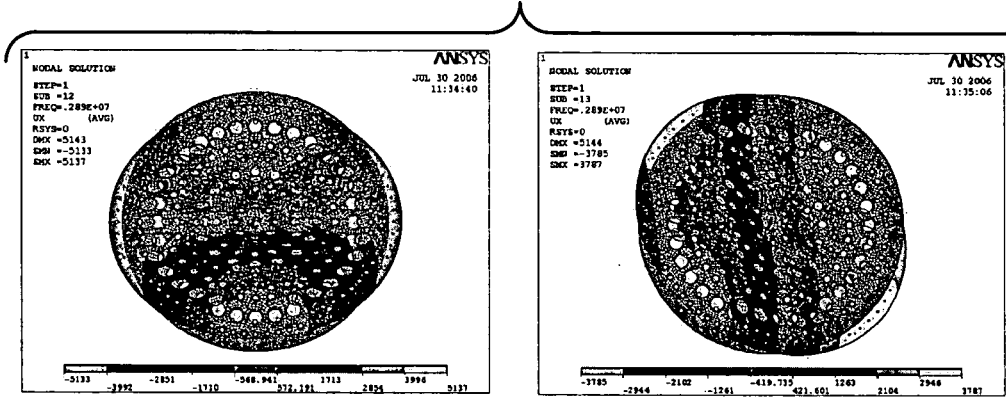

FIGS. 2a and 2b show ANSYS simulations of elliptical modes of an exemplary bulk acoustic wave gyroscope 10. Due to the anisotropic nature of (100) single crystal silicon, only secondary elliptical modes of a (100) SCS disk that are spatially 30° apart have identical frequencies (FIG. 2a). In (111) SCS disk gyroscopes 10, the primary elliptical modes of the disk resonator 12 (which are spatially 45° apart) have identical frequencies (FIG. 2b). As a result, the electrodes 13 are placed every 30° for (100) SCS or 45° for (111) SCS circumferentially around the disk resonator 12 to maximize the sense and drive transductions. In order to release the disk gyroscope 10 from the front side, release holes are added to the disk structure. The release holes 15 are repeated symmetrically every 30° in (100) silicon disk (or 45° in (111) silicon disk) to minimize any possible frequency split between the two degenerative elliptic modes.

One of the prominent design parameters in designing any vibratory gyroscope is the angular gain. The angular gain is defined as the ratio of the lag in the vibration pattern angle to the angle of rotation and it depends on the sensor structure as well as the resonant mode operation. The angular gain was derived for solid disk structures and it is 1.8 times larger for primary elliptic modes (0.45) than the secondary elliptic modes (0.24) in the disk gyroscopes 10. Although the sensitivity of (111) silicon disk gyroscope 10 is higher than the similar device in (100) silicon disk due to the larger angular gain, (100) silicon substrates 11 have advantages in terms of CMOS compatibility and supply availability compared to (111) single crystal silicon.

Figure 10:
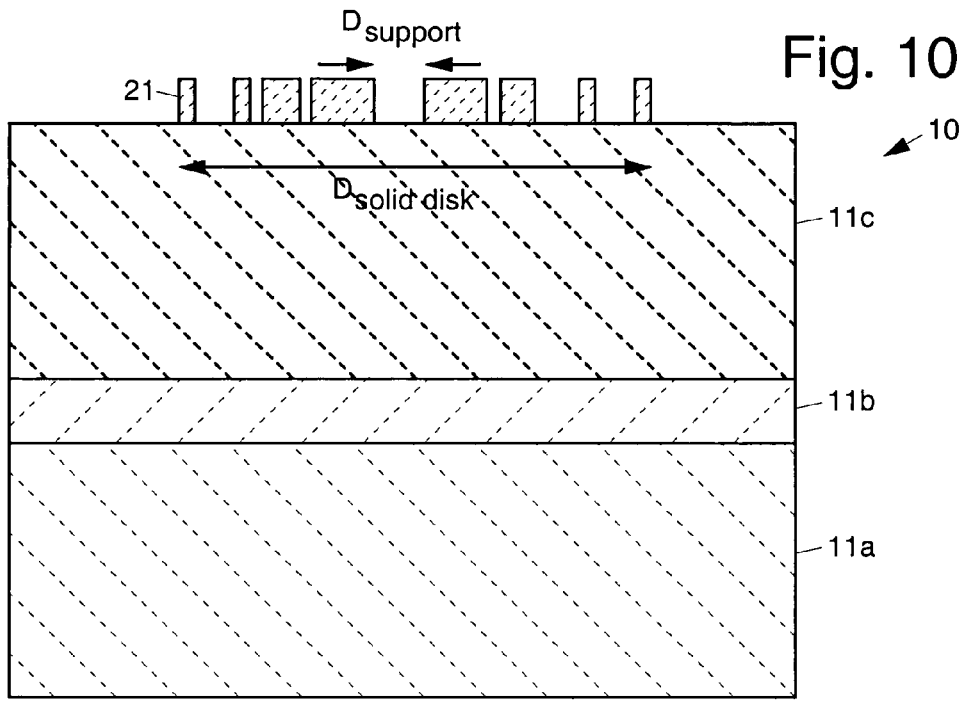
FIGS. 10-17 illustrate fabrication of an exemplary bulk acoustic wave gyroscope.
Figure 11:
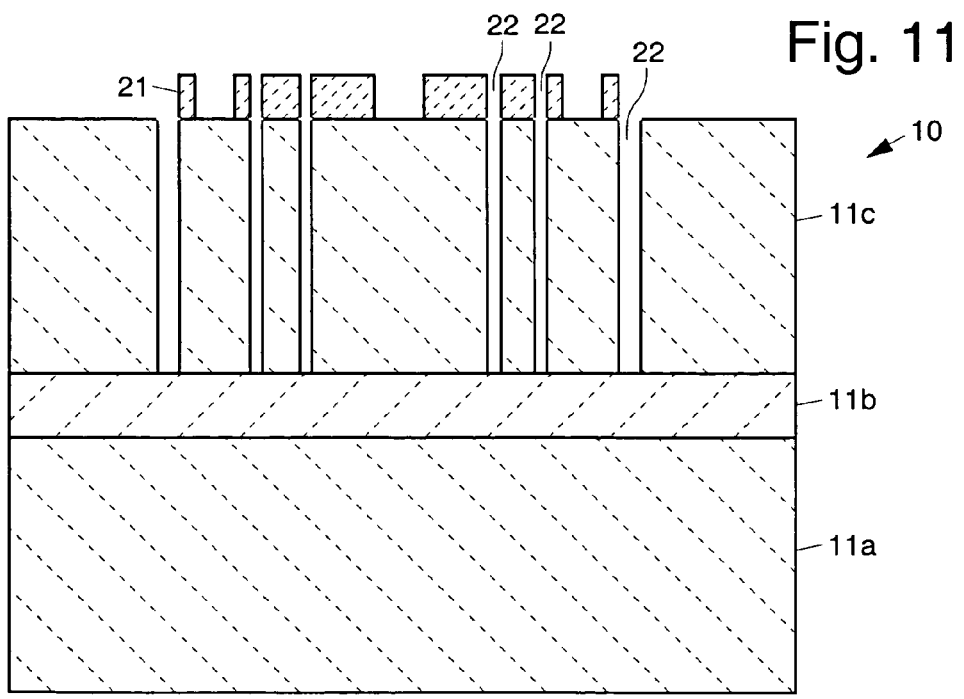
Figure 12:
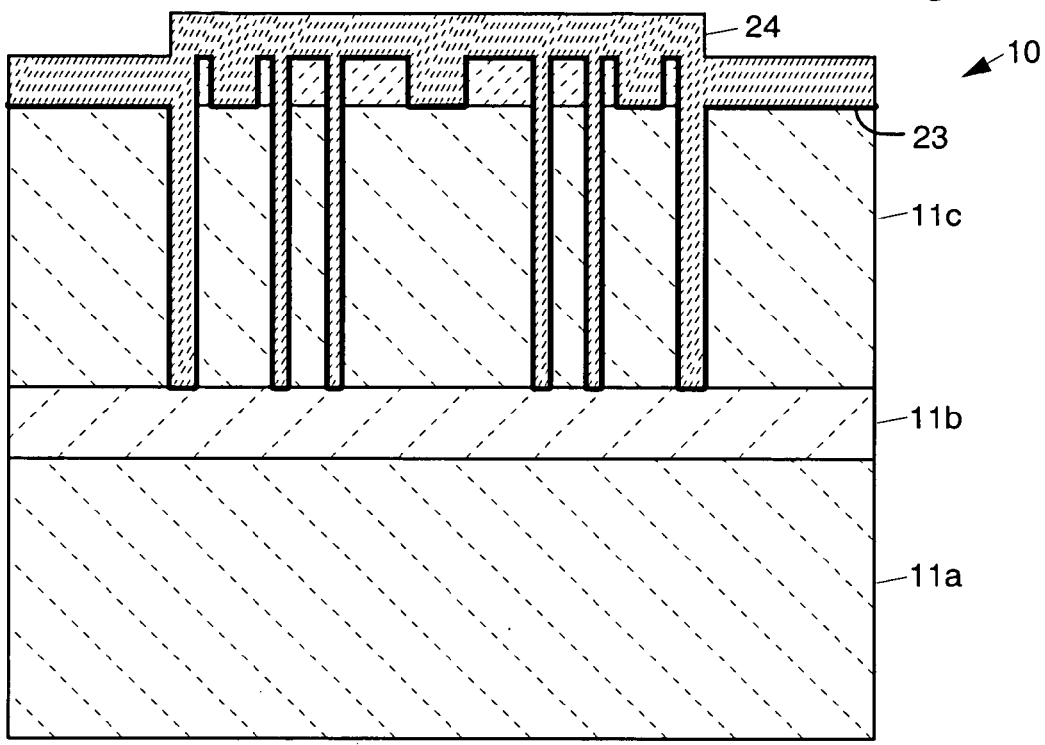
Figure 13:
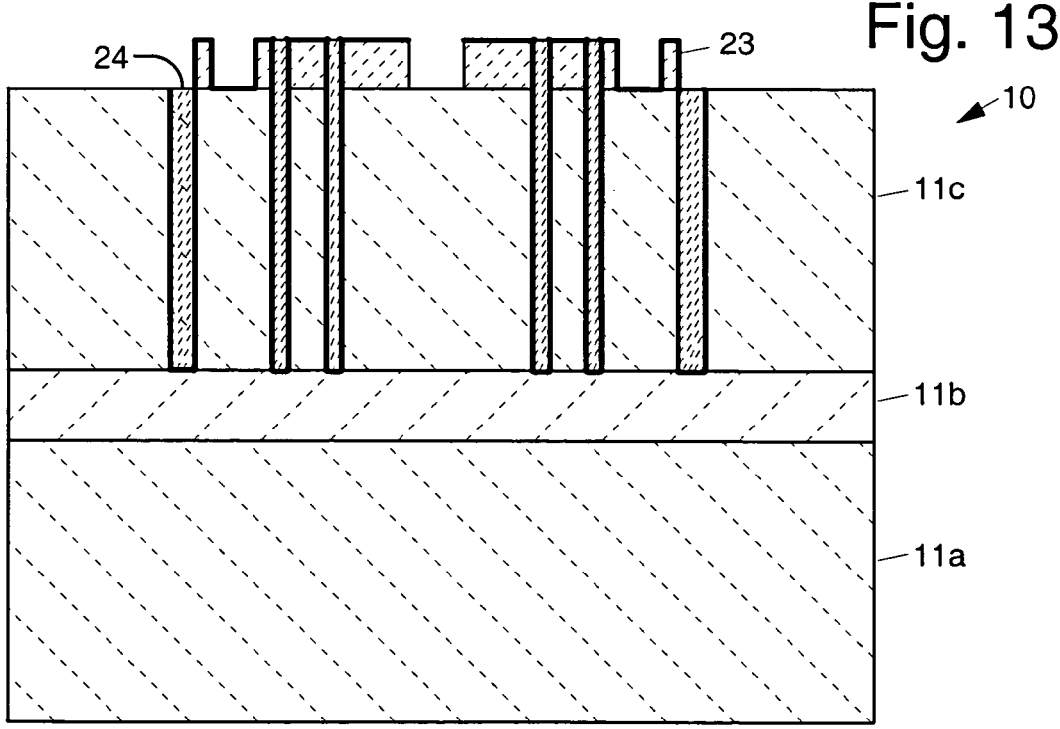
Figure 14:
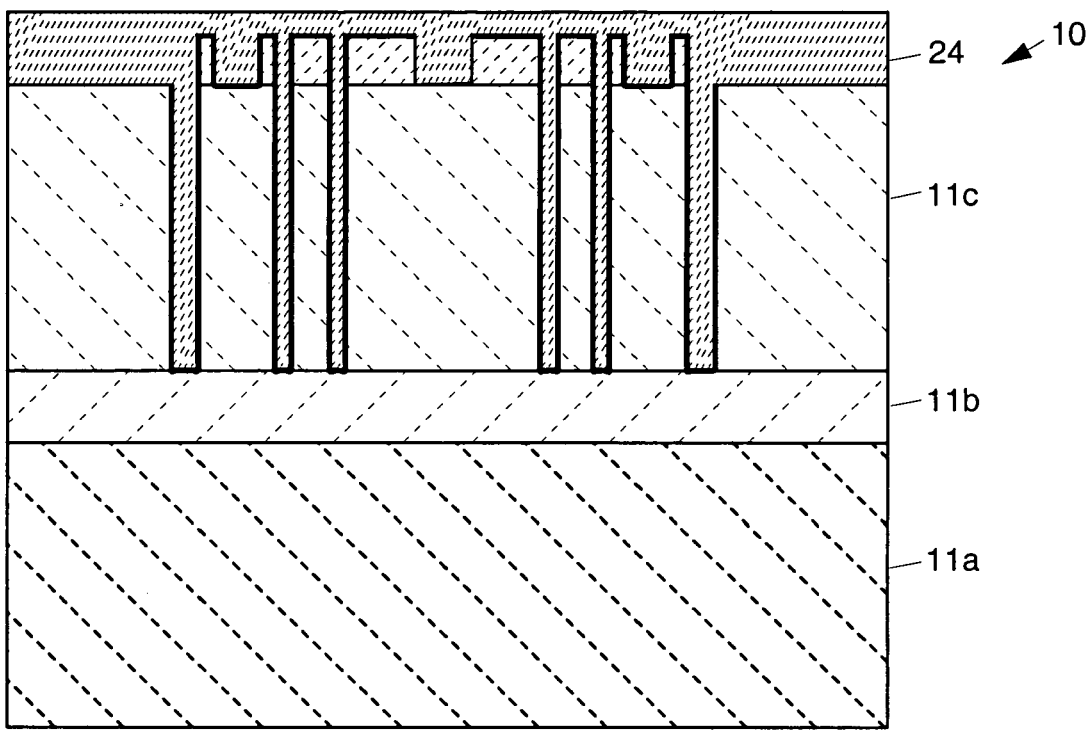
Figure 15:
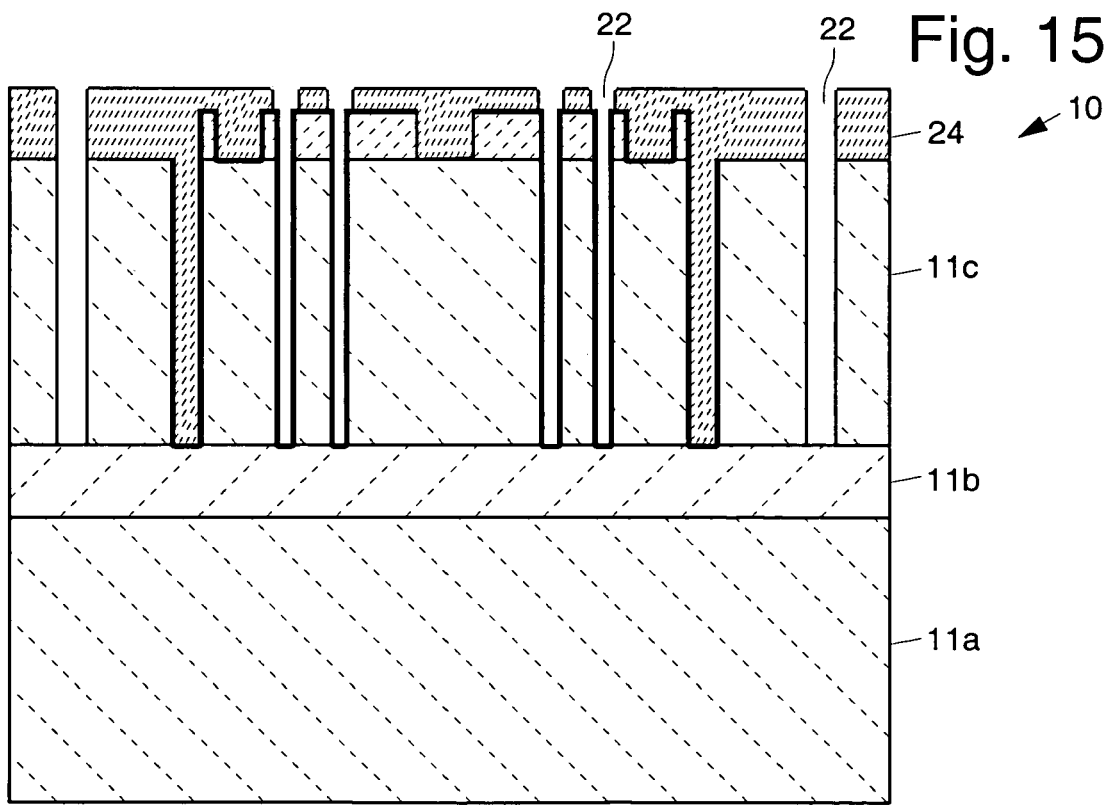
Figure 16:
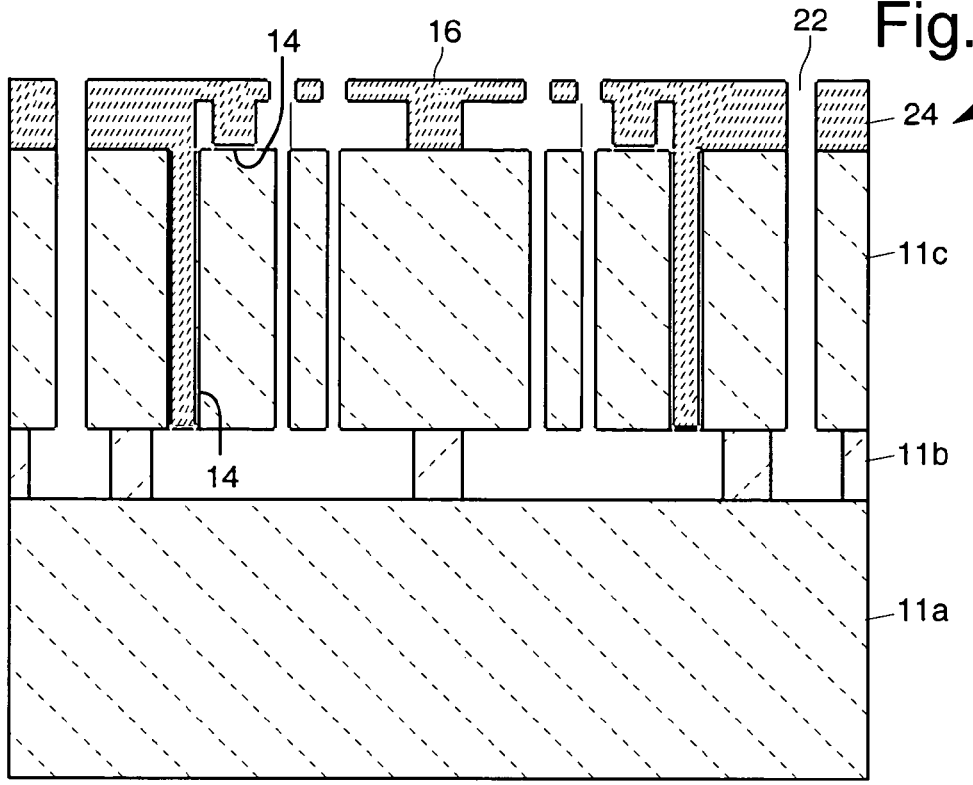
Figure 17:
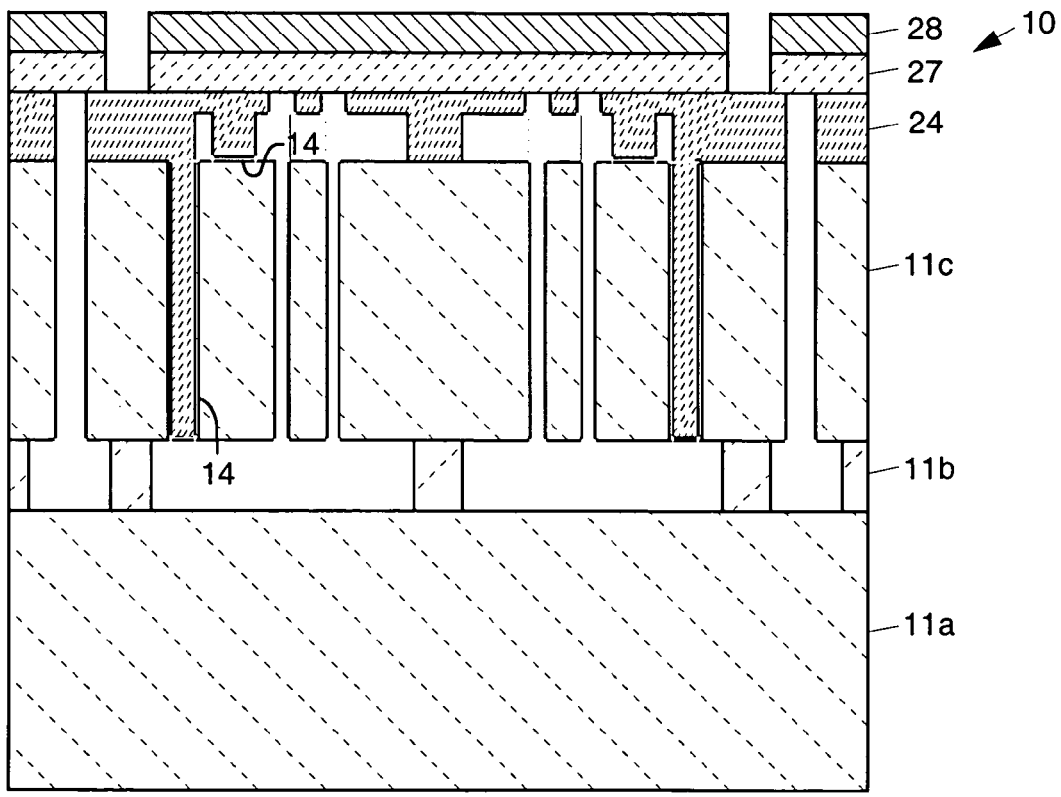

Prototype gyroscopes 10 were fabricated on thick SOI wafers 11, or substrate 11 (30-50 µm-thick), using the HARPSS process. An exemplary fabrication process flow is shown in FIGS. 10-17. In FIG. 10, a 2 µm thick sacrificial oxide mask 21 on an SOI substrate 11 (bottom layer 11a, insulating (buried oxide) layer 11b, device layer 11c) is patterned. Deep trenches 22 are etched (FIG. 11) through the device layer 11c to define the resonating SCS structures. In FIG. 12, thin layer of sacrificial LPCVD oxide 23 is deposited that form capacitive gaps 14, and the trenches 22 are filled with LPCVD polysilicon 24 subsequently. Next, the LPCVD polysilicon 24 is etched on the surface and the sacrificial oxide 23 is patterned on the surface (FIG. 13), and a LPCVD polysilicon layer 24 is deposited, doped and annealed (FIG. 14). After patterning (FIG. 15) the polysilicon on the surface to define pads, the polysilicon inside the trenches 22 and parts of the device layer 11c are removed (FIG. 16) to define the electrodes 13. The device is then released in hydrogen fluoride (HF). The buried oxide layer 11b of the SOI substrate 11 can be used to support the disk resonator 12 at the bottom, which calls for careful timing of the HF release. The polysilicon trace 16 (FIG. 3) on the surface is used to provide a DC bias to the disk resonator 12. Also, each polysilicon electrode 13 partially extends out on the disk structure 12 to provide an out-of-plane shock stop. In addition, the extended polysilicon electrodes 13 can be used as in-plane electrodes in X-Y axis gyroscopes 10 to excite and sense the out-of plane degenerative modes. As is shown in FIG. 17, PECVD oxide 27 is deposited and patterned and conductive material 28 (Aluminum, for example) is deposited to vacuum seal the gyroscope 10, in case very high performance is desired. This process is compatible with Analog Device's SOIMEMS process discussed by M. W. Judy, "Evolution of Integrated Inertial MEMS Technology," *Solid-State Sensors, Actuators and Microsystems Workshop,* Hilton Head Island, S.C., June 2004, pp. 27-32, and may be integrated with CMOS electronics by adding some pre- and post-CMOS fabrication steps.

Figure 4A:
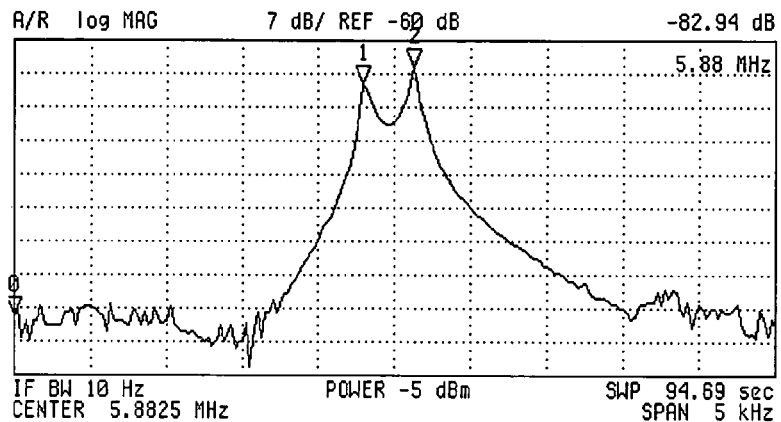
FIGS. 4a and 4b show frequency response of unmatched and matched secondary elliptical modes of an exemplary 800 µm diameter bulk acoustic wave gyroscope.
Figure 4B:
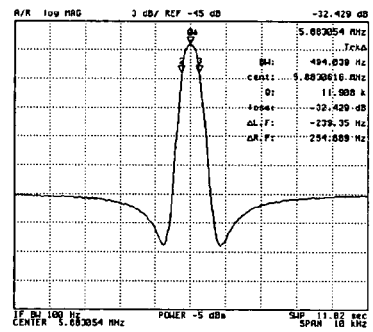

Exemplary (100) silicon and (111) silicon disk gyroscopes 10 were tested. A sinusoidal drive signal was applied at the drive electrode 13a and output signal was monitored at sense electrode 13b. The sense electrode 13b is located circumferentially off the drive electrode 13a by 30° for (100) silicon and by 45° for (111) silicon disk gyroscope 10. Measurement results of an exemplary (100) silicon disk gyroscope 10 will now be discussed. High-order elliptical modes of an exemplary 800 µm diameter (100) disk gyroscope 10 were observed at 5.9 MHz with a frequency split of 300 Hz (FIG. 4). FIG. 4 shows the measured Q of 125,000 and 100,000 of the high order elliptical modes for this device in 1 mTorr vacuum. The corresponding Q values in 10 Torr vacuum were still very high for this device (100,000 and 74,000).

A small initial frequency separation of 290 Hz between the drive and sense modes of this perforated device can be matched by the application of proper tuning voltages to tuning electrodes 13c around the disk gyroscope 10. The matched-mode quality factor of the device was recorded to be 12,000. Mode-matching was achieved by applying a tuning voltage of 10V DC. A large bandwidth (BW) of ~490 Hz was measured for the bulk acoustic wave disk gyroscope 10 at frequency of 5.88 MHz which is 100 times larger than low frequency mode-matched gyroscopes.

Figure 5:
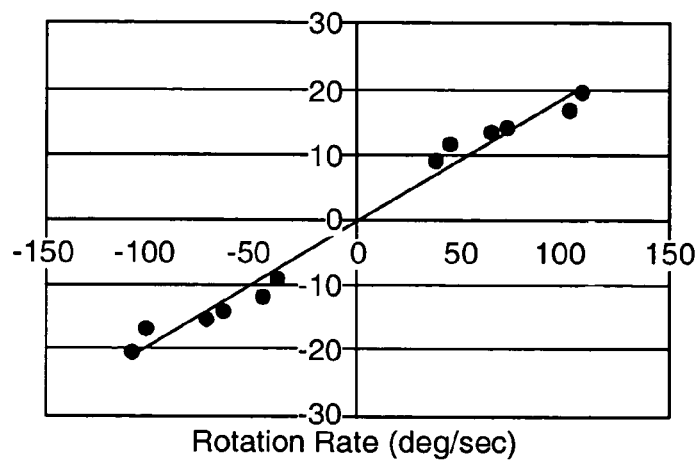
FIG. 5 is a graph that shows measured sensitivity results of an exemplary reduced to practice 800 µm diameter bulk acoustic wave gyroscope in (100) silicon substrate.

The output voltage from the exemplary gyroscope 10 was measured at different angular speeds. The measured rate sensitivity of 800 µm diameter (100) SCS disk gyroscope 10 is 0.19 mV/°/sec as is shown in FIG. 5, which is 17 times higher than that of the low frequency polysilicon star gyroscope reported by M. F. Zaman, et. al., "The Resonating Star Gyroscope," *Proceedings IEEE Conference on MEMS,* January 2005, pp. 355-358.

Figure 6:
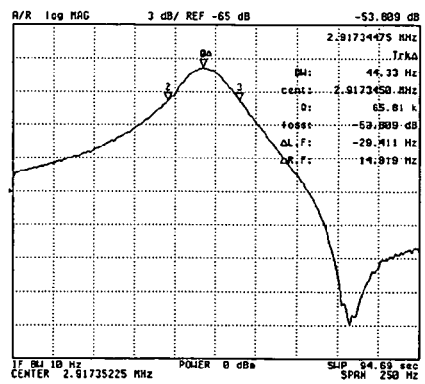
FIG. 6 shows the frequency response of primary elliptical modes of an exemplary reduced to practice of 1200 µm diameter bulk acoustic wave gyroscope in (111) silicon substrate.

Measurement results of a (111) silicon disk gyroscope 10 will now be discussed. The primary elliptic modes of 1200 µm diameter disk gyroscope 10 were observed less than 100 Hz apart without applying any tuning voltages. The $Q_{effective-sense}$ of (111) disk gyroscopes was 66,000 and 58,000, in 1 mTorr and 1 Torr vacuum, respectively (FIG. 6).

The rate sensitivity response of an exemplary 1200 µm diameter (111) SCS disk is presented in FIG. 7. The measured rate sensitivity of 1200 µm diameter (111) bulk acoustic wave disk gyroscope 10 with discrete electronics is 0.94 mV/°/sec which demonstrates higher rate sensitivity compared to the (100) disk (0.20 mV/°/sec). This is expected due to the larger angular gain and smaller frequency separation of the two elliptic modes in the (111) disk 12.

Bias drift estimation will now be discussed. Gyro scale factor stability and bias drift are essential performance parameters in a gyroscope. The scale factor stability is directly affected by the stability of the $Q_{effect\text{-}sense}$ over time. It was observed that the measured $Q_{effect\text{-}sense}$ remained constant over a period of 24 hours at a fixed room temperature and pressure. The zero rate output (ZRO) of the device was sampled. Using the collected ZRO data an Allan variance analysis was performed to characterize the long-term stability of the matched-mode device interfaced with the discrete electronics. A root Allan variance plot of an exemplary 1200 µm diameter (111) silicon disk gyroscope 10 is shown in FIG. 8. The measured bias instability of the gyroscope 10 is 5.4°/hr (with less than 100 Hz mode separation). If desired, the two resonance modes can be tuned and aligned by applying small DC voltages (<10V) to the tuning electrodes 13 around the disk, which translates into higher sensitivity and improved bias stability for devices.

Design specifications for an exemplary 1200 µm diameter vibratory bulk acoustic wave (111) silicon gyroscope 10 are summarized in Table 1. In prototype designs, the minimum detectable rotation rate is limited by the electronic noise which is mainly due to the high operating frequency. This problem can be solved by further increasing the gap aspect-ratio (AR>250) and use of very low noise amplifiers ($V_n$<100 nV/$\sqrt{Hz}$).

TABLE 1

Summary of specifications for a 1200 µm diameter (111) SCS disk gyroscope.

| Device parameter | Values |
| --- | --- |
| Primary order elliptical mode frequency | 2.90 MHz (ANSYS) |
|  | 2.917 MHz (measured) |
| Device thickness | 35 µm |
| Capacitive gap | 180 nm |
| DC polarization voltage | 7 V |
| Effective Quality Factor | Qsense = 66,000 (measured) |
| Theoretical mechanical resolution | 0.0442°/hr |
| Total noise | 5.622°/hr/Hz (measured) |
| Bias instability | 5.4°/hr (measured) |
| Sensor sensitivity | 4.7 aF/°/s |
| Rate sensitivity | 0.94 mV/°/s (measured) |

Thus, bulk acoustic wave gyroscopes have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Gyroscope apparatus, comprising:
   a substrate having a plane;
   a bulk acoustic resonator element; and
   a plurality of electrodes surrounding and separated from the resonator element by a very small capacitive gaps, which electrodes can excite and detect at least two degenerate bulk acoustic wave resonant modes in the resonator;
   wherein the gyroscope apparatus senses rate or angle of rotation about at least one axis in the plane of the substrate.

2. The apparatus recited in claim 1 wherein the substrate supports the bulk acoustic resonator element.

3. The apparatus recited in claim 1 wherein the capacitive gaps are on the order of 200 nanometers or less.

4. The apparatus recited in claim 1 further comprising direct current and alternating current voltage sources for the excitation and tuning of the apparatus.

5. The apparatus recited in claim 1 wherein the resonator element is a disk-shaped structure made of a polysilicon or single-crystalline silicon.

6. The apparatus recited in claim 1 wherein the resonator has a bulk acoustic wave resonant frequency which is at least 1 MHz.

7. The apparatus recited in claim 1 further comprising support electronics for excitation, readout and turning of the resonator element.

8. The apparatus recited in claim 1 wherein at least three bulk acoustic resonator elements and corresponding pluralities of electrodes are integrated on a single substrate to sense rate or angle of rotation about three orthogonal axes.

9. Gyroscope apparatus, comprising:
   a handle substrate;
   a disk resonator element supported by the handle substrate;
   a plurality of electrodes surrounding and separated from the disk resonator element by very small capacitive gaps, which electrodes can excite and detect at least two degenerate bulk acoustic wave resonant modes in the disk resonator; and
   support electronics for excitation, readout and tuning of the disk resonator.

10. The apparatus recited in claim 9 wherein the capacitive gaps are on the order of 200 nanometers or less.

11. The apparatus recited in claim 9 wherein the disk resonator has a bulk acoustic wave resonant frequency which is at least 1 MHz.

12. The apparatus recited in claim 9 wherein the disk resonator is supported by the handle substrate at its center.

13. The apparatus recited in claim 9 wherein the disk resonator is aligned with a support element at a center of the disk resonator.

14. The apparatus recited in claim 9 wherein the disk resonator is perforated.

15. The apparatus recited in claim 9 which senses rate or angle of rotation about a vertical axis perpendicular to the plane of the substrate.

16. The apparatus recited in claim 9 which senses rate or angle of rotation about at least one axis in the plane of the substrate.

17. The apparatus recited in claim 9 wherein one or more resonator elements and one or more pluralities of electrodes and support electronics are integrated on a single substrate to form an integrated inertial measurement unit.

\* \* \* \* \*

UNITED STATES PATENT AND TRADEMARK OFFICE
CERTIFICATE OF CORRECTION

PATENT NO. : 7,543,496 B2  
APPLICATION NO. : 11/601956  
DATED : June 9, 2009  
INVENTOR(S) : Farrokh Ayazi et al.

Page 1 of 1

It is certified that error appears in the above-identified patent and that said Letters Patent is hereby corrected as shown below:

In the Claims:

Column 7, line 59, in claim 1, please replace "capactive" with -- capacitive --;

Column 8, line 21, in claim 7, please replace "turning" with -- tuning --.

Signed and Sealed this

Twenty-ninth Day of December, 2009

David J. Kappos
*Director of the United States Patent and Trademark Office*